(12) United States Patent
Zahav

(10) Patent No.: US 12,130,867 B2
(45) Date of Patent: Oct. 29, 2024

(54) MANAGING PRE-CACHING OF RESULTS

(71) Applicant: Microsoft Technology Licensing, LLC, Redmond, WA (US)

(72) Inventor: Haviv Zahav, Ramat Ha'Sharon (IL)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 18/145,714

(22) Filed: Dec. 22, 2022

(65) Prior Publication Data
US 2024/0211516 A1 Jun. 27, 2024

(51) Int. Cl.
G06F 7/00 (2006.01)
G06F 16/00 (2019.01)
G06F 16/903 (2019.01)

(52) U.S. Cl.
CPC .............. G06F 16/90335 (2019.01)

(58) Field of Classification Search
USPC ................. 707/706–788, 706–787
See application file for complete search history.

(56) References Cited

U.S. PATENT DOCUMENTS

| | | | |
|---|---|---|---|
| 9,424,315 B2 | 8/2016 | Chamdani et al. | |
| 10,715,959 B2 | 7/2020 | Begeja et al. | |
| 11,176,556 B2 | 11/2021 | Song et al. | |
| 11,397,611 B2 | 7/2022 | Kleine et al. | |
| 11,436,231 B2 | 9/2022 | Danilov et al. | |
| 2016/0171008 A1* | 6/2016 | Ciabrini | G06F 16/24552 707/609 |
| 2017/0317938 A1* | 11/2017 | Abraham | H04W 52/0212 |
| 2019/0258631 A1* | 8/2019 | Pal | G06F 16/22 |
| 2020/0053182 A1 | 2/2020 | Lutz | |

OTHER PUBLICATIONS

"Azure Cache for Redis Documentation", Retrieved From: https://learn.microsoft.com/en-us/azure/azure-cache-for-redis/, Retrieved on: Sep. 8, 2022, 3 Pages.
"Caching guidance", Retrieved From: https://learn.microsoft.com/en-us/azure/architecture/best-practices/caching, Retrieved on: Sep. 8, 2022, 38 Pages.
"Latency Thresholds dialog parameters", Retrieved from: https://www.ibm.com/docs/en/iirfz/11.3.0?topic=subscription-latency-thresholds-dialog-parameters, Nov. 15, 2022, 1 Page.
Lepow, et al., "Add caching to improve performance in Azure API Management", Retrieved from: "https://learn.microsoft.com/en-us/azure/api-management/api-management-howto-cache", Nov. 23, 2022, 4 Pages.

(Continued)

Primary Examiner — Tuan A Pham
(74) Attorney, Agent, or Firm — Barta Jones, PLLC

(57) ABSTRACT

A computer-implemented method includes receiving, from a requestor, a first instance of a data query corresponding to a data identifier. A time taken to execute the first instance of the data query is compared to a latency threshold. In response to determining that the time exceeds the latency threshold, data, obtained by executing the first instance of the data query and corresponding to the data identifier, is stored in a cache memory. A pre-cache scheduling request, identifying the data query and comprising an instruction to schedule a second instance of the data query, is generated.

20 Claims, 7 Drawing Sheets

(56) References Cited

OTHER PUBLICATIONS

Lepow, et al., "Custom caching in Azure API Management", Retrieved from: https://learn.microsoft.com/en-us/azure/api-management/api-management-sample-cache-by-key, Jun. 6, 2022, 9 Pages.

Mathew, Nicky, "Redis Latency Monitoring—Enable it with ease", Retrieved from: https://bobcares.com/blog/redis-latency-monitoring/, Dec. 21, 2020, 9 Pages.

Pan, et al., "An enhanced active caching strategy for data-intensive computations in distributed GIS", In Journal of Supercomputing, vol. 73, Issue 10, Mar. 20, 2017, pp. 4324-4346.

Saleem, et al., "Data Caching Across Microservices in a Serverless Architecture", Retrieved From: https://aws.amazon.com/blogs/architecture/data-caching-across-microservices-in-a-serverless-architecture/, Jul. 21, 2021, 6 Pages.

Wagner, et al., "Task-based asynchronous pattern (TAP) in .NET: Introduction and overview", Retrieved From: https://learn.microsoft.com/en-us/dotnet/standard/asynchronous-programming-patterns/task-based-asynchronous-pattern-tap, Mar. 11, 2022, 9 Pages.

"Caching Best Practices—Amazon Web Services", Retrieved From: https://aws.amazon.com/caching/best-practices/, Jun. 19, 2021, 9 Pages.

International Search Report and Written Opinion received for PCT Application No. PCT/US2023/081473, Feb. 20, 2024, 15 pages.

\* cited by examiner

Figure 2

| Result | Query Time | Last Access Time | Scheduled Message ID |
|---|---|---|---|
| XX | 05.12.22 15:23 | 05.12.22 10:14 | M12 |
| YY | 05.12.22 15:48 | 02.12.22 15:35 | M03 |
| . . . | . . . | . . . | . . . |

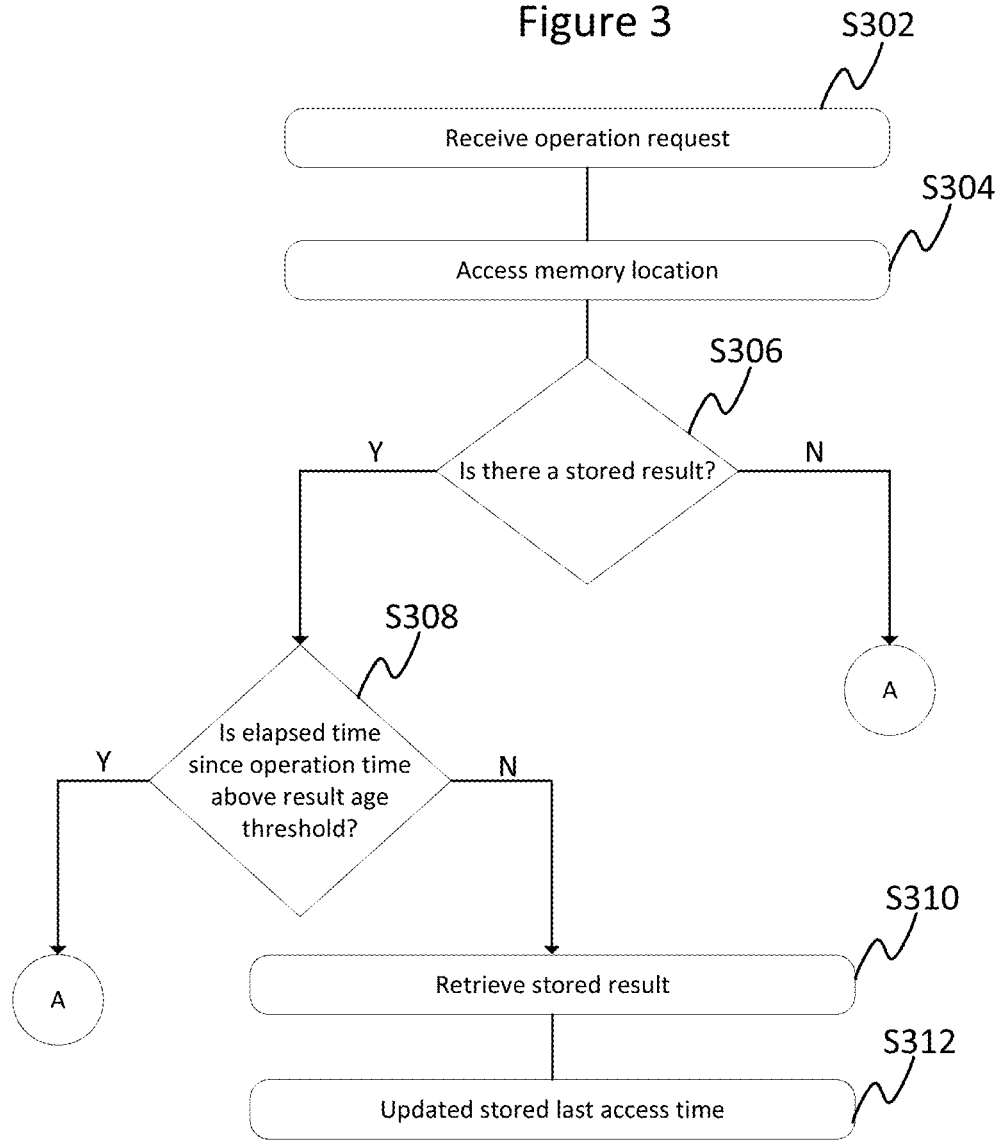

MANAGING PRE-CACHING OF RESULTS

TECHNICAL FIELD

The present disclosure relates to pre-caching results of computational operations, and in particular methods and system for determining when to schedule pre-caching.

BACKGROUND

Computer services generate results by performing computational operations or tasks. In some cases, these tasks can be performed in advance, with results of the tasks being stored. The results can then be accessed when the result is requested, avoiding the need to perform the operation at that time.

SUMMARY

There is provided herein a computer-implemented method for pre-caching data. A data query is received from a requestor, the data query corresponding to a data identifier which may be used to obtain the data from databases. The data query is executed and a time taken to execute the data query determined. In the event that the time taken to executed the data query exceeds a latency threshold, the data obtained by executing the data query is stored in a cache memory. A scheduling request is also generated. The scheduling request causes a pre-cache service to schedule the data query to be executed again after a defined time interval has elapsed, and to update the data stored in the cache memory.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of the present disclosure and to show how embodiments may be put into effect, reference is made by way of example to the accompanying drawings in which:

FIG. 2 is a schematic diagram of a database for storing results in a cache memory;

DETAILED DESCRIPTION OF EMBODIMENTS

Figure 1:
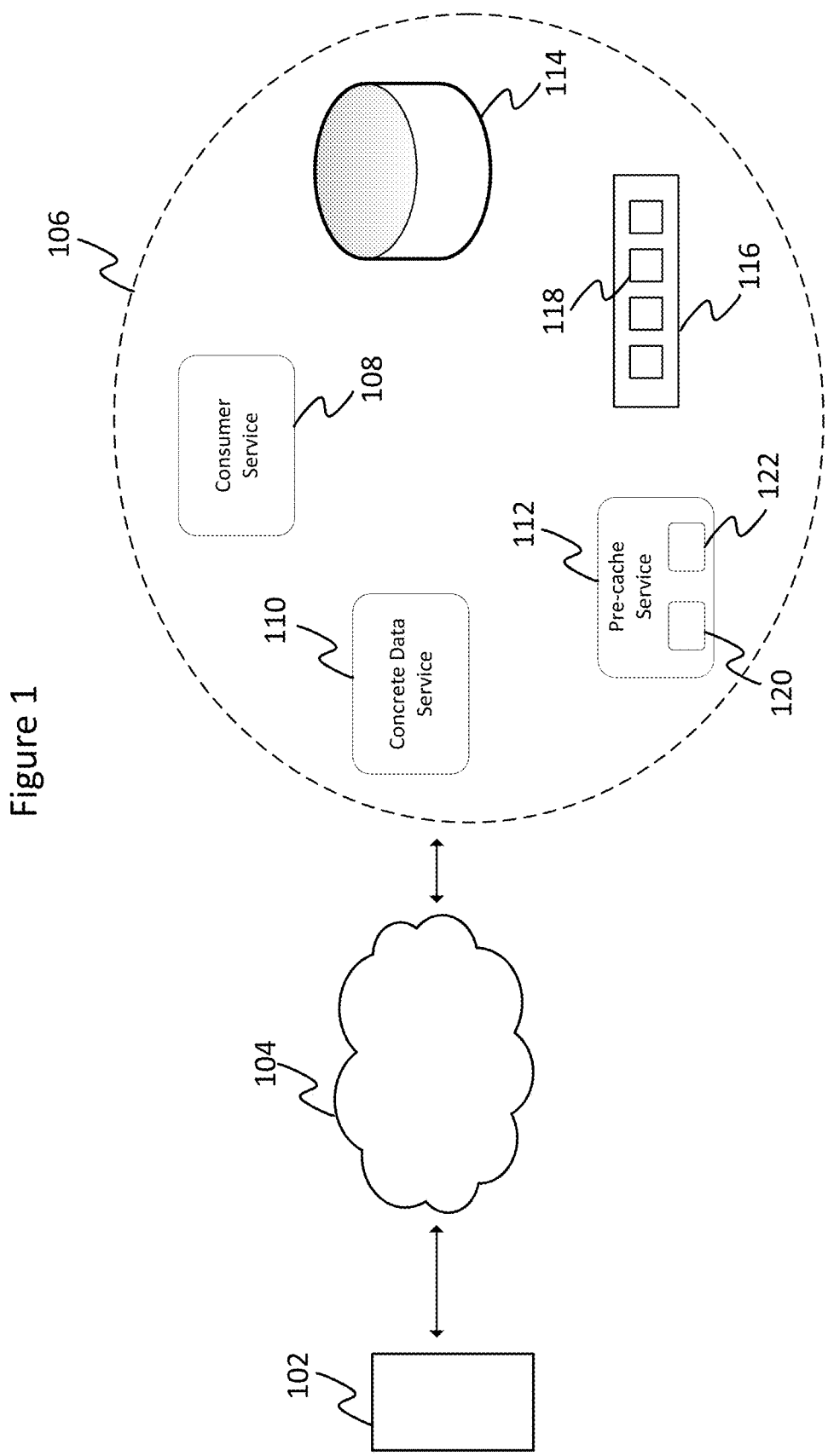
FIG. 1 is a schematic block diagram of a cloud computing system.

Consumer services provide end users with information based on computational operations, including queries and calculations. These operations may, in some cases, be more difficult, take a long time to perform, and may be prone to transient errors from external resources, such as timeouts or throttling due to the heaviness of the queries. In these cases, the end user may have a worse user experience as they must wait a noticeable about of time for requested information to be provided to them.

The results used for the consumer service may not need to be 100% accurate. For example, some services provide metrics or statistics that indicate trends. For such services, presenting results obtained within a time interval, such as 30 minutes, is sufficient to provide the user with the information with suitable accuracy. Also, the actual size of the results, or data-points, may be small, so the changes over periods smaller than the time interval may be insignificant.

Results of the operations can be obtained in advance and cached such that they can be provided more quickly when requested by the user. If data on which the operations are performed changes with time, the operations may be scheduled to be performed at regular time intervals, with the time interval being such that the data is sufficiently accurate for the intended end use.

In this way, when a user requests the information, the operations do not need to be run. Instead, the relevant result(s) are retrieved from the cache.

However, performing each operation and storing the obtained result at regular intervals is expensive and computationally wasteful for a number of reasons:

Some users may not use all features of the service, so performing the associated operations multiple times per day for those users is wasteful, as they will never use the associated data-points or results.

Some users use features of the service heavily for a few days and then stop for a long while. Again, performing the associated operations during those later periods is wasteful, as these data-points won't be used.

The operations for many of the users are quick. Performing those operations in advance is wasteful since it provides no difference in speed for the user and therefore is not necessary. Using pre-cached results causes the system to present older data, albeit from within the time interval of pre-caching, without the additional advantage of significantly reducing latency.

The described embodiments implement methods for determining if and when to schedule a computational operation to be performed and a result of the operation pre-cached. By pre-caching the result, the result, or a value based thereon, can be provided more quickly to a requesting entity. However, performing computational operations in advance can be a wasteful use of computational resources if the results are not often required by the requesting entity, or if the operation is quick to perform when compared to a time to retrieve the result from storage.

The methods herein schedule a computational operation to be performed, and the result pre-cached, by considering at least one of:

A latency of the operation, that is the time taken for the operation to be performed to obtain the result; and A last access time, that is a time at which the result was last requested by the requesting entity.

If the latency of the operation exceeds a threshold, the operation is scheduled. This reduces the time for the result to be provided to a requesting entity upon request. At the same time, this limits the operations that are scheduled to those for which there is a marked increase in speed if results are pre-cached. Therefore, computational resources are efficiently allocated.

If an elapsed time since the last access time of the pre-cached result exceeds a threshold, the operation ceases to be re-scheduled. In this way, only results which are likely to be requested by the requesting entity are pre-cached, reducing the number of operations which are unnecessarily performed. This also allows computational resources to be efficient allocated.

That is, the methods provided herein pre-cache results of computational operations only for a subset of operations for which the requesting entity would benefit from the pre-caching, i.e. those calculations which are slow, and only during times the results are actually used.

The methods provided herein save costs, allowing for the use of cheaper resources with less storage and lower maximum capacities, as well as reducing the load on the resources by reducing transient errors such as throttling.

FIG. 1 provides an example environment in which the methods disclosed herein may be implemented. A user device 102 communicates with a cloud computing system 106 via a network 104 such as the Internet. Cloud computing systems deliver computing services, such as servers, storage, databases, and software, over the Internet. Cloud computing systems are known in the art and will therefore not be described in detail herein.

The cloud computing system 106 comprises multiple computing services. In the example of FIG. 1, the cloud computing system 106 comprises a consumer service 108, a concrete data service 110, a pre-cache service 112, a cache (or memory) 114, and a message queue 116.

The consumer service 108 provides a service to a user of the user device 102. An example consumer service 108 may be a security information and event manager (SIEM) platform for analysing large volumes of data across an enterprise. To provide the service, the consumer service 108 performs computational operations to obtain results. In the examples provided herein, the computational operation is a data query. The consumer service 108 communicates with the concrete data service 110 to retrieve data corresponding to a data identifier defined by the data query. The obtained data may be referred to herein as a result. In some embodiments, the computational operation my comprise performing a calculation using the obtained data to compute the result.

The consumer service 108 communicates with the cache 114 to store the data with the data identifier. The data identifier is a hash of the data query, although it will be appreciated that the data identifier may be derived from the data query in some other way such as being provided in the data query. The cache 114 is a key-value database. The cache 114 can searched to find a stored data item whose key is the data identifier.

The pre-cache service 112 comprises an API controller 120 and a background program 122. The API controller 120 receives pre-cache scheduling requests from the consumer service 108, and generates a scheduled data query 118 in response to each operation scheduling request. The scheduled data queries 118 are sent to the message queue 116, where they are queued until a scheduled event time of the scheduled data query 118 arrives. The message queue 116 may be a service bus queue supporting a messaging service connecting application, service, and devices running in the cloud 106.

When the scheduled event time arrives, the pre-cache request is sent to the background program 122, which performs the scheduled operation. The operation is performed by the background program 122 in the same way as by the consumer service 108. That is, in the example used herein, the background program 122 accesses the concrete data service 110 to obtain the data.

The background service 122 then stores the obtained data (the result) in the cache 114 sorted in association with the data identifier of the data query, replacing the result currently stored at that location. To locate the data already stored in the cache 114, the pre-cache service 112 hashes the data query to compute the data identifier, and uses the data identifier to search the cache 114 for the associated stored data. The background service 122 also generates a scheduled data query 118 which it sends to the bus queue 116 for queueing, such that the background program 122 performs the data query again, i.e. accesses the concrete data service 110 to retrieve the data associated with the data identifier, after a defined time interval has elapsed.

The consumer service 108 also accesses the cache 114. When a data query is received at the consumer service 108 from the user device 102, also referred to herein as a requestor, the consumer service 108 accesses the cache 114 to determine if a result is stored therein associated with the data identifier. If a result is stored in the cache 114, the stored result is provided as the result. However, if no result is stored in the cache 114, the consumer service 108 performs the operation.

FIG. 2 shows an example cache database 200 for storing results of operations for use in the methods disclosed herein.

The example database 200 comprises four fields: a result field 202, a query time field 204, a last access time field 206, and a scheduled message ID field 208.

When a result is obtained, either by the consumer service 108 or the background program 122 of the pre-cache service 112, the obtained result is stored in the result field 202. A query time, i.e. the time at which the result was obtained, is stored in the associated query time field 204.

A scheduled data query 118 is generated to cause the result to be updated after a defined time period. The scheduled data query 118 has a scheduled message identifier, also referred to herein as the data identifier, unique to the data query, which is stored in the scheduled message ID field 208. When the request 118 is received by the background program 122, the background program is able to replace the last obtained result stored in the cache 114 with the updated result using the scheduled message identifier to locate the last stored result.

When a user, or other requesting entity, requests the result from the consumer service 108, the consumer service 108 accesses the database 200 to retrieve the stored result. When retrieving the result, the consumer service 108 updates a last access time stored in the last access time field 206. The consumer service 108 also updates the stored last access time when it stores a result which it has obtained in response to a request from the requesting entity.

The methods provided herein define criteria for determining whether to schedule an operation. The methods use the stored query time, the stored last access time, and/or a computation latency.

Figure 3:
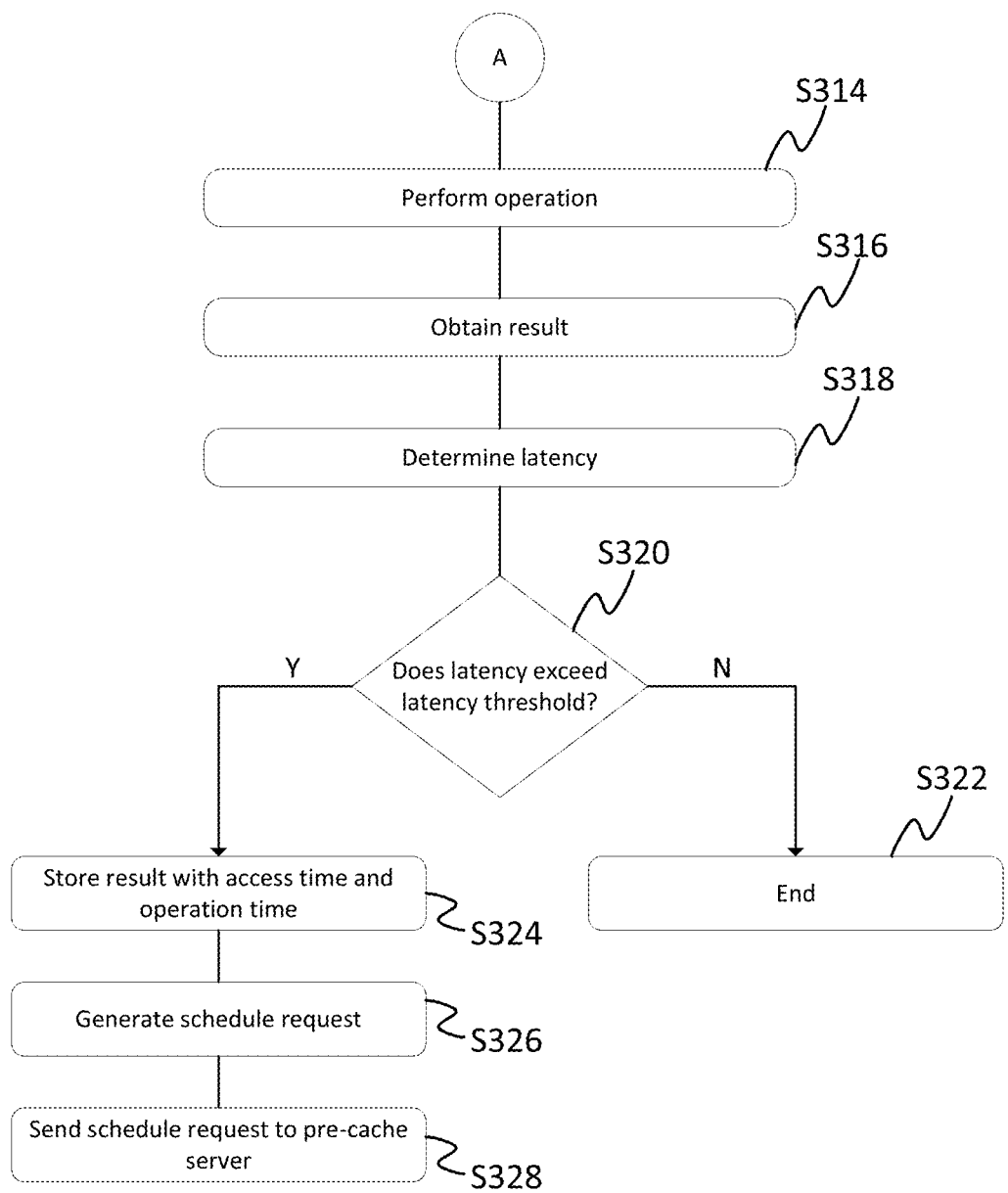
FIG. 3 is a flow chart of a method of scheduling an operation based on an age of a stored result and/or a latency of the operation.

FIG. 3 provides an example method implemented by the consumer service 108.

At step S302, the consumer service 108 receives an operation request (data query) from the user device 102. The consumer service 108 accesses the cache 114 and uses the data identifier derived from the data query to access a memory location associated with the data identifier of the data query at step S304.

Once the cache 114 has been accessed, the consumer service 108 determines if there is a result of the operation stored in the cache 114 at step S306.

If there is a result stored, the consumer service 108 determines if an elapsed time since the last time the operation was performed (the stored query time) exceeds result age threshold, step S308. That is, the consumer service 108 uses the query time stored with the result to determine an age of the result and compare the age of the result to the result age threshold. The result age threshold may be defined for each operation, for a set of operations the consumer service 108 is configured to perform, or for all operations of the consumer service 108.

If the age of the result does not exceed the result age threshold, the result is retrieved from the cache 114, step S310, and the last access time stored in the cache 114 is updated, step S312.

If it is found at step S306 that there is no result stored in the cache 114, or at step S308 that the age of the stored result exceeds the result age threshold, the consumer service 108 performs the operation, step S314, to obtain a result, step S316. The result obtained when the consumer service 108 performs the operation may be referred to herein as a first result.

The consumer service 108 determines a latency of the operation at step S318. The latency of the operation is a time taken for the operation to be performed by the consumer service 108. The consumer service 108 compares the operation latency to a latency threshold at step S320, to determine if the latency exceeds the latency threshold.

If the operation latency does not exceed the latency threshold, the method ends at step S322. That is, the result obtained by the consumer service 108 at step S316 is not stored in the cache 114, nor is the operation scheduled for pre-caching. When the consumer service 108 receives a next data query corresponding to the same data identifier, it performs the operation again.

If instead it is found at step S320 that the operation latency does exceed the latency threshold, the consumer service 108 stores the result in the cache 114 together with a query time of the time at which the consumer service 108 performed the operation (S314), step S324.

The consumer service 108 also generates a schedule request at step S326, which defines the operation and a time interval at which the operation is to be repeated and the result stored in the cache 114. The schedule request is sent to the API controller 120 of the pre-cache service 112 at step S328.

The latency check performed by the consumer service 108 at step S320, with operations with a latency less than the latency threshold not being scheduled for pre-caching, results in a system in which only those operations which are slow are scheduled for pre-caching. The term slow may be used here when comparing the latency of the operation to a time taken to retrieve results from the cache 114.

In this way, only some of the operations are scheduled for pre-caching, so reducing the number of operations being performed in the background, with those scheduled operations being those for which pre-caching results makes a marked difference in speed and thus only for operations for which pre-caching would benefit the user. Therefore, the results can be provided more quickly while not wasting computing resources by pre-caching results which would provide no, or limited, improvement to the user experience.

The latency threshold may be, for example, 2 seconds. It will be appreciated that the latency threshold can be defined to be any value that is appropriate given the time for retrieving results from a memory in which they are stored. The latency exceeds the latency threshold if the latency is greater than the latency threshold, that is greater than 2 seconds in this example.

In the example system of FIG. 1, the cache 114 is a Redis cache which is quick to query. Using the system of FIG. 1, the latency of providing results may be reduced using pre-cached results from above the latency threshold (here a few seconds) to a few milliseconds. It will be appreciated that other memories or caches could be used in the system of FIG. 1 that can be queried quickly in comparison to the speed of the operations.

As set out above, at step S308 the age of the stored result is compared to an age threshold. This method step ensures that any stored results which are old are not provided in error to the user. Here, the term old may be used with reference to a schedule interval user for pre-caching results. Schedule intervals are discussed below. It will be appreciated that this step may not be implemented if old results are removed from the cache 114—see for example step S412 of FIG. 4.

Figure 4:
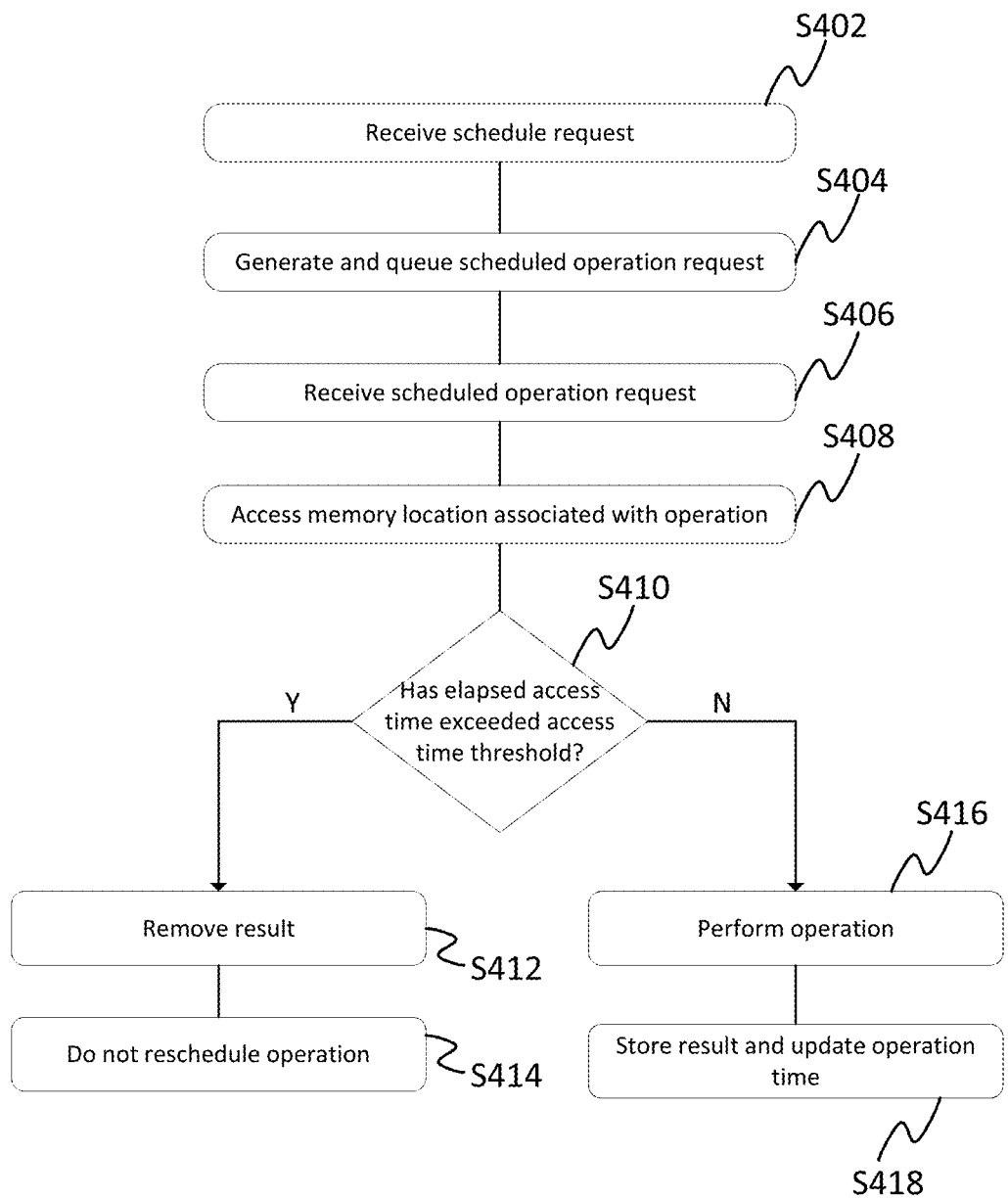
FIG. 4 is a flow chart of a method of pre-caching a result based on user activity associated with the result.

FIG. 4 shows an example method implemented by the pre-cache service 112.

At step S402, the API controller 120 of the pre-cache service 112 receives the schedule request from the consumer service 108. The schedule request is the request generated at step S326 of the method of FIG. 3.

As set out above, the schedule request defines the operation to be scheduled and the time interval for scheduling. In some embodiments, the request does not define the time interval for rescheduling. Instead, this may be predefined at the pre-cache service 112 such that all operations are pre-cached at the same time interval.

In response to receiving the schedule request, the API controller 120 generates a scheduled operation request 118, which it sends to the bus queue 116 for queuing, step S404. The scheduled operation request, also referred to herein as a second or next instance of the data query, comprises:
  CacheKey [string]—identifier in cache 114;
  ScheduleEvery [Timespan]—time interval for scheduling operations, e.g. 30 minutes;
  StopAfterNoAccess [Timespan]—access time threshold after which no more operations are scheduled, e.g. 3 days; and
  Request details—the details required to make the call to the concrete service 110 (e.g. URL, port, headers, body).

The bus queue 116 stores scheduled operation requests 118 in a queue. When the scheduled message time arrives, that is when the time interval has elapsed, the scheduled message request 118 is received at the background program 122, step S406. The scheduled operation request 118 is timestamped when generated such that the scheduled message time can be determined. Alternatively, the scheduled operation request 118 may comprise a scheduled message time, calculated based on the interval time and the time at which the scheduled operation request 118 is generated.

The background program 122 uses the CacheKey of the scheduled operation request 118 to access the memory location in the cache 114 at which the data is stored, step S408. The CacheKey is the data identifier referenced above.

The background program 122 obtains from the cache 114 the last access time, and uses the last access time to determine an elapsed time since the last access time. This is compared to an access time threshold at steps S410. The access time threshold, in this example, is the StopAfterNoAccess time defined in the scheduled data query 118, although it will be appreciated that instead the access time threshold may be defined at the background program 122 and no threshold is included in the scheduled data query 118.

If it is determined that the elapsed time exceeds the threshold, the result stored at the associated memory location in the cache 114 is removed, step S412, and no further operations are scheduled, step S414.

If instead it is determined at step S410 that the elapsed time does not exceed the access time threshold, the background program 122 performs the operations, step S416, by accessing the concrete data service 110 and retrieving the data. The background program 122 then stores the data (result) in the cache 114 at the memory location identified by CacheKey of the scheduled operation request 118, at step S418. The background program 122 also updates the query time, as referred to as the operation time, stored in the cache 114 to the time when the operation was performed at step S416.

The result obtained when the operation is performed by the pre-cache service 112 may be referred to herein as an update result.

The determination at step S410, that is determining is the elapsed access time exceeds the access time threshold, provides an indication of whether the result is likely to be accessed, or requested, soon. That is, the last access time provides an indication of user or service engagement with the result of the operation. If the user is not engaged with the result, the elapsed time since the last access time is long, and so the operation is not rescheduled.

In this way, operations are only rescheduled in time periods in which the results of the operations are likely to be used. This reduces the number of operations performed which obtain results which are not used, and therefore is a more efficient use of the available computing resources.

Figure 5:
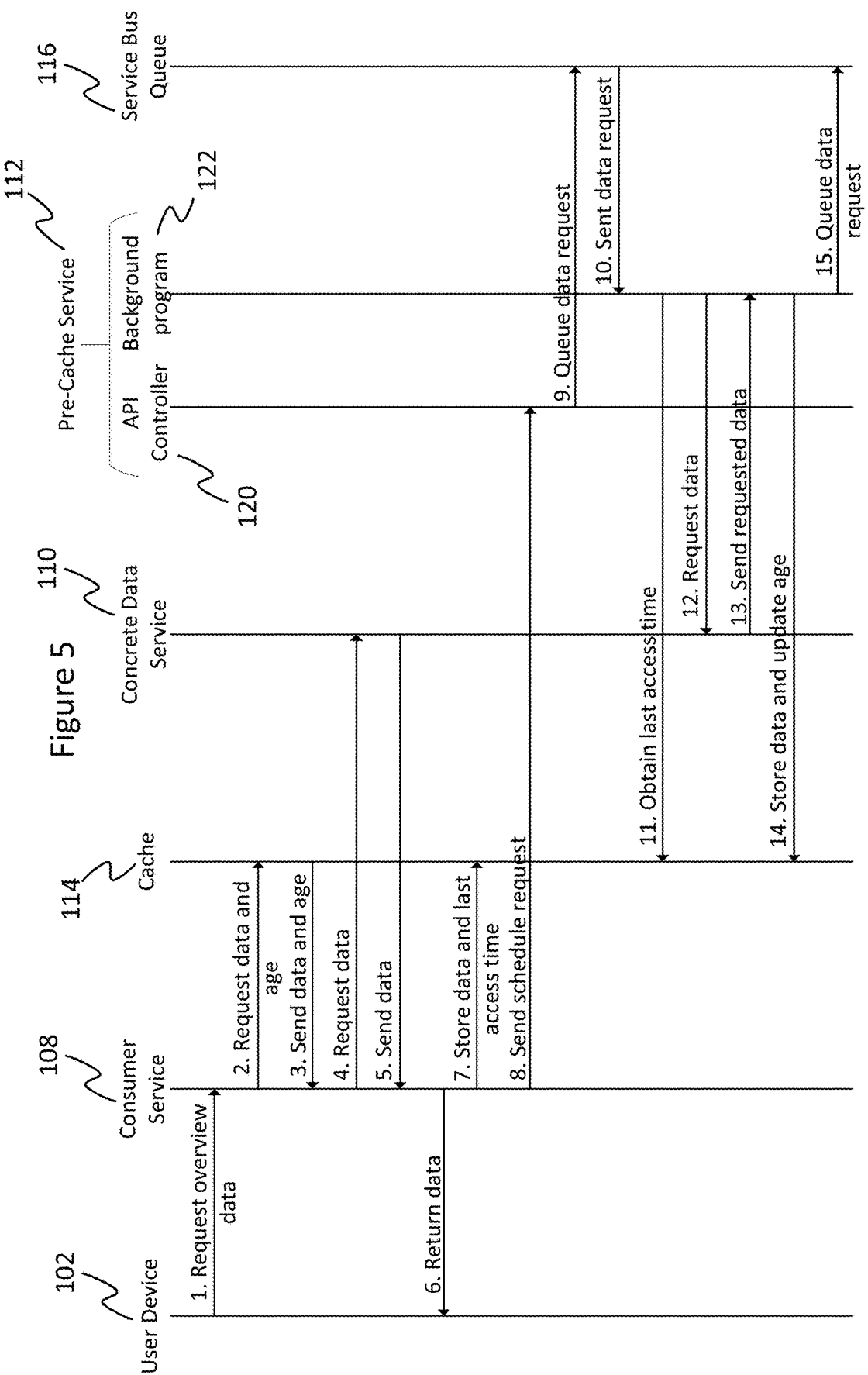
FIG. 5 is a method of scheduling operations and pre-caching data in the cloud computing system.

FIG. 5 shows how the method steps of FIGS. 3 and 4 set out above are implemented within the system of FIG. 1.

At step 1, the user device 102 requests overview data from the consumer service 108. A user interface of the consumer service 108 is provided at the user device 102. This may be via an application stored locally on the user device 102, via an internet browser accessed on the user device 102, or any other suitable method as would be apparent to the skilled person. The request for the overview data may be generated by the user of the user device 102 interacting with the user interface, for example by selecting an option provided in the user interface to view overview data. Providing overview data is used herein as an example service provided by the consumer service 108 which uses the results of the computational operations.

In the present example, the overview data comprises, or is otherwise based on, the result of the operation. The operation is the example of FIG. 5 is that of retrieving data from the concrete data service 110.

At step 2, the consumer service 108 requests data and the query time of the stored data from the cache 114. It is assumed in the example of FIG. 5 that there is a stored result and stored query time, stored at the cache 114, which is made accessible to the consumer service 108 at step 3.

The consumer service 108 determines the age of the stored data as set out with respect to FIG. 3 above. It is assumed that the age of the stored data exceeds the age threshold. Therefore, the consumer service 108 sends a request to the concrete data service 110 for the data at step 4, which is made available to the consumer service 108 at step 5.

The consumer service 108 returns the data in response to the user request in the user interface at the user device 102 at step 6.

The consumer service 108 determines if the query latency exceeds the latency threshold. In the example of FIG. 5, it is assumed that the latency exceeds the latency threshold. Therefore, the consumer service 108 stores the data at the cache 114 with the last access time corresponding to the time at which the request for overview data was received and the query time of when the data was retrieved from the concrete data service 110, step 7.

The consumer service 108 also sends a pre-cache scheduling request to the API controller 120 of the pre-cache service 112 at step 8, requesting that the data query be rescheduled at regular, defined, time intervals by the pre-cache service 112. The API controller 120 generates a scheduled data query 118, defining a time interval and the data query comprising the data identifier, which it queues at the service bus queue 116, step 9.

When a time period equal to the time interval of the scheduled data query 118 has elapsed, the scheduled data query 118 is sent to the background program 122 by the service bus queue 116, step 10. In response to receiving the scheduled data query 118, the background program 122 obtains the last access time from the cache 114 at step 11. The background program checks that the elapsed time since the last access time does not exceed the access threshold as set out above with respect to FIG. 4. It is assumed in the example of FIG. 5 that the access time threshold is not exceeded.

The background program 122 then requests the data corresponding to the data identifier from the concrete data service 110 at step 12, which the concrete data service provides to the background program 122 at step 13.

The background program 122 stores the data and the query time at the cache 114 at step 14. The background program then generates another scheduled data query 118, defining the data query to be executed and the time interval, and sends the scheduled data query 118 to the service bus queue 116 for queueing.

In a further method, instead of scheduling operations at defined time intervals, a machine learning model is used to predict when an end user will request information, and thus scheduled operations to be performed, and the results cached, shortly before the predicted time.

Using the scheduling method set out with reference to FIG. 4, in which the operations are scheduled based on a last access time, there may be instances in which the computational resources are used unnecessarily to pre-cache results. For example, a user may request information once and then not request the information again until the last access time threshold has lapsed. In this instance, results are cached but not used, so unnecessarily using computer resources, without any benefit to the user as the latency of the operation is felt again when user next requests the information.

The machine learning model is trained to identify, based on a user's pattern of usage within the consumer service 108, when a user is likely to request that a specific operation is performed. The machine learning model may be a component of the consumer service 108, the pre-cache service 112, or it may run on a separate service within the cloud computing environment 106.

The machine learning model predicts that the user will request information within a specific time period. In response, the background program 122 of the pre-cache service 112 preforms the operation and stores the result in the cache 114. The consumer service 108 accesses the cached result from the cache 114 in response to the information request.

It will be appreciated that the method of FIG. 3 may still be implemented, with the scheduled request being a request to use the machine learning model to predict when a result will be requested. That is, the use of the machine learning predictions may be dependent on the latency of the operations exceeding the latency threshold.

This method reduces the computational resources used to obtain results which are not used by the end user, and may provide more accurate results to users when requested. This is because the machine learning model can be trained to predict information which will be requested within a smaller time window. For example, the machine learning model may predict that a result will be required within the next 5 minutes, such that the results provided to the user are at most 5 minutes old. In the methods set out above, pre-caching of results would be, for example, every 30 minutes to balance both computational resources used and the need for accurate results.

In the examples set out above, the result stored at the cache 114 is a data value retrieved from the concrete data service 110. It will be appreciated that the result may be a result of any computational operation. For example, the result may be a value derived from the retrieved data value. Alternatively, the result may not be derived from any value retrieved from a data service.

The methods described above have been described as being implemented by the system FIG. 1. The system of FIG. 1 is provided by way of example only and may be modified to suit the service being provided. For example, the pre-cache service 112 may be a component of the consumer service 108.

In some embodiments, one or more of the services 108, 110, 112, and cache 114 are not cloud based computing services, but instead are provided on local or remote servers. For example, the consumer service 108 may be implemented on the user device 102, and communicates with the concrete data service 110, pre-cache service 112, and cache 114 via the Internet 104.

In some embodiments, the requesting entity is a component of the consumer service 108 itself. That is, a component of the consumer service 108 requests the result from another component of the consumer service 108, which accesses the cache 114 to retrieve the stored result.

Figure 6:
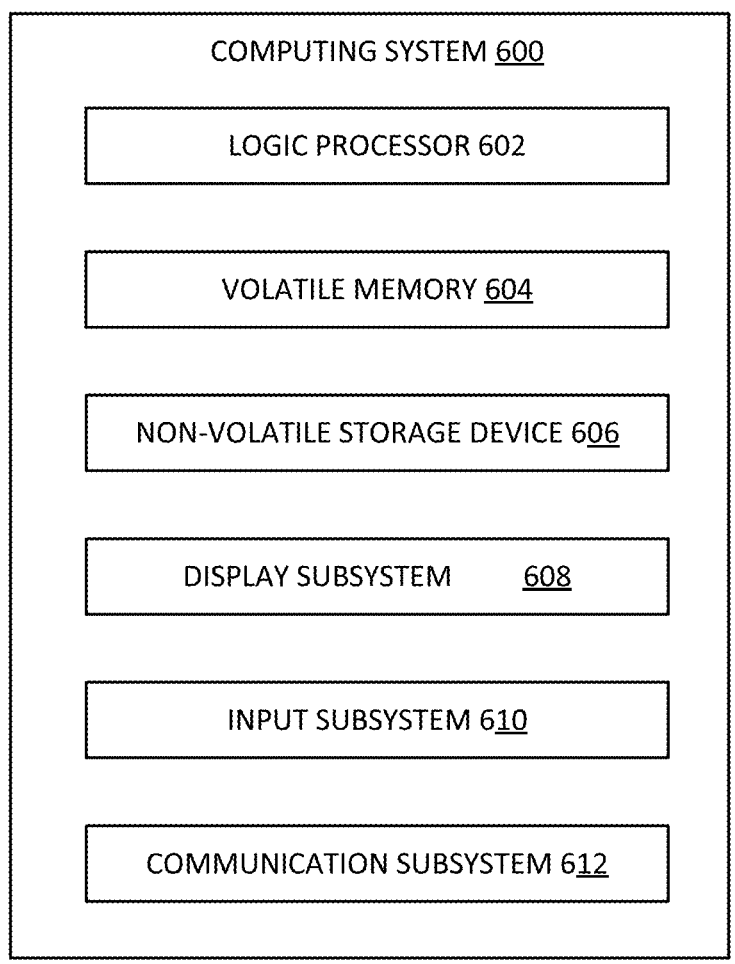
FIG. 6 schematically shows an example of a computing system.

FIG. 6 schematically shows a non-limiting example of a computing system 600, such as a computing device or system of connected computing devices, that can enact one or more of the methods or processes described above. Computing system 600 is shown in simplified form. Computing system 600 includes a logic processor 602, volatile memory 604, and a non-volatile storage device 606. Computing system 600 may optionally include a display subsystem 608, input subsystem 610, communication subsystem 612, and/or other components not shown in FIG. 6. Logic processor 602 comprises one or more physical (hardware) processors configured to carry out processing operations. For example, the logic processor 602 may be configured to execute instructions that are part of one or more applications, programs, routines, libraries, objects, components, data structures, or other logical constructs. The logic processor 602 may include one or more hardware processors configured to execute software instructions based on an instruction set architecture, such as a central processing unit (CPU), graphical processing unit (GPU) or other form of accelerator processor. Additionally or alternatively, the logic processor 602 may include a hardware processor(s) in the form of a logic circuit or firmware device configured to execute hardware-implemented logic (programmable or non-programmable) or firmware instructions. Processor(s) of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor 602 may be virtualized and executed by remotely accessible, networked computing devices configured in a cloud-computing configuration. In such a case, these virtualized aspects are run on different physical logic processors of various different machines. Non-volatile storage device 606 includes one or more physical devices configured to hold instructions executable by the logic processor 602 to implement the methods and processes described herein. When such methods and processes are implemented, the state of non-volatile storage device 606 may be transformed—e.g., to hold different data. Non-volatile storage device 606 may include physical devices that are removable and/or built-in. Non-volatile storage device 606 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive), or other mass storage device technology. Non-volatile storage device 606 may include nonvolatile, dynamic, static, read/write, read-only, sequential-access, location-addressable, file-addressable, and/or content-addressable devices. Volatile memory 604 may include one or more physical devices that include random access memory. Volatile memory 604 is typically utilized by logic processor 602 to temporarily store information during processing of software instructions. Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example. The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604. Different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc. When included, display subsystem 608 may be used to present a visual representation of data held by non-volatile storage device 606. The visual representation may take the form of a graphical user interface (GUI). As the herein described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices. When included, input subsystem 610 may comprise or interface with one or more user-input devices such as a keyboard, mouse, touch screen, or game controller. When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the internet. The term computer readable media as used herein may include computer storage media. Computer storage media may include volatile and non-volatile, removable and non-removable media (e.g., volatile memory 604 or non-volatile storage 606) implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by a computing device (e.g. the computing system 600 or a component device thereof). Computer storage media does not include a carrier wave or other propagated or modulated data signal. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct wired connection, and wireless media such as acoustic, radio frequency (RF), infrared, and other wireless media.

According to a first aspect, there is provided a computer-implemented method comprising: receiving, from a requestor, a first instance of a data query, the data query corresponding to a data identifier; executing the first instance of the data query; determining that a time taken to execute the first instance of the data query exceeds a latency threshold; and in response to determining that the time taken to execute the first instance of the data query exceeds the latency threshold:
  storing data, obtained by executing the first instance of the data query and corresponding to the data identifier, in a cache memory; and generating a pre-cache scheduling request identifying the data query and comprising an instruction to schedule a second instance of the data query.

According to some examples, the method may further comprise: in response to receiving the first instance of the data query, accessing the cache memory; and determining that there is no data corresponding to the data identifier stored in the cache memory; wherein the first instance of the data query is executed in response to determining that there is no data corresponding to the data identifier stored in the cache memory.

According to some examples, the data may be stored in the cache memory with an operation time defining a time at which the stored data was obtained, wherein the method further comprises: in response to receiving the first instance of the data query, accessing the cache memory; obtaining, from the cache memory, the operation time stored with the data corresponding to the data identifier; and determining that an elapsed time since the operation time exceeds an operation time threshold; wherein the first instance of the data query is executed in response to determining that the elapsed time since the operation time exceeds the operation time threshold.

According to some examples, the method may further comprise: receiving a third instance of the data query from the requestor; in response to receiving the third instance of the data query, accessing the cache memory; obtaining the data corresponding to the data identifier stored in the cache memory; and storing, with the data corresponding to the data identifier in the cache memory, a current time as a last access time.

According to some examples, the method may further comprise deriving the data identifier from the data query.

According to some examples, the method may further comprise sending the pre-cache scheduling request to a pre-cache service.

According to some examples, the method may further comprise: receiving, at a pre-cache service, the pre-cache scheduling request; and in response to receiving the pre-cache scheduling request: generating the second instance of the data query; and queuing the second instance of the data query for a defined time interval.

According to some examples, the method may further comprise, after the defined time interval has elapsed: receiving, at the pre-cache service, the second instance of the data query; in response to receiving the second instance of the data query: executing the second instance of the data query; updating the data corresponding to the data identifier stored in the cache memory with the data obtained by executing the second instance of the data query; generating a fourth instance of the data query; and queuing the fourth instance of the data query for the defined time interval.

According to some examples, the data corresponding to the data identifier may be stored in the cache memory with an operation time defining a time at which the data was obtained, wherein the method further comprises, in response to receiving the second instance of the data query: updating the operation time stored in the cache memory.

According to some examples, the method may further comprise, in response to receiving the second instance of the data query: obtaining a last access time associated with the data corresponding to the data identifier stored in the cache memory, wherein the last access time corresponds to a time at which the first instance of the data query was received from the requestor; and determining that an elapsed time since the last access time does not exceed an access time threshold; wherein the fourth instance of the data query is generated in response to determining that the elapsed time since the last access time does not exceed the access time threshold.

According to some examples, the method may further comprise, after the defined time interval has elapsed: receiving, at the pre-cache service, the second instance of the data query; in response to receiving the second instance of the data query: obtaining a last access time associated with the data corresponding to the data identifier stored in the cache memory, wherein the last access time corresponds to a time at which the first instance of the data query was received from the requestor; determining that an elapsed time since the last access time exceeds an access time threshold; and in response to determining that the elapsed time since the last access time exceeds the access time threshold, not generating a fourth instance of the data query.

According to some examples, the method may further comprise removing the stored data from the cache memory.

According to some examples, the method may further comprise: receiving, from the requestor, a first instance of a second data query, the second data query corresponding to a second data identifier; executing the first instance of the second data query; determining that a second time taken to execute the first instance of the second data query does not exceed the latency threshold; in response to determining that the second time taken to execute the first instance of the second data query does not exceed the latency threshold: receiving a second instance of the second data query; and executing the second instance of the second data query.

According to some examples, the method may further comprise making the data obtained by executing the first instance of the data query available to the requestor.

According to some examples, the method may further comprise making the data obtained by executing the third instance of the data request available to the requestor.

According to some examples, the method may further comprise sending the second instance of the data query to a message bus queue, wherein the second instance of the data query is queued at the message bus queue for the defined time interval.

According to some examples, the data identifier may be a hash value derived from the data query.

According to some examples, the data may be stored in the cache memory with the data identifier.

According to a second aspect, there is provided a computer device comprising: a processing unit; a memory coupled to the processing unit and configured to store executable instructions which, upon execution by the processing unit, are configured to cause the processing unit to: receive, from a requestor, a first instance of a data query, the data query corresponding to a data identifier; execute the first instance of the data query; determine that a time taken to execute the first instance of the data query exceeds a latency threshold; and in response to determining that the time taken to execute the first instance of the data query exceeds the latency threshold: store data, obtained by executing the first instance of the data query and corresponding to the data identifier, in a cache memory; and generate a pre-cache scheduling request identifying the data query and comprising an instruction to schedule a second instance of the data query.

According to a third aspect, there is provided a computer-readable storage device comprising instructions executable by a processor for: receiving, from a requestor, a first instance of a data query, the data query corresponding to a data identifier; executing the first instance of the data query; determining that a time taken to execute the first instance of the data query exceeds a latency threshold; and in response to determining that the time taken to execute the first instance of the data query exceeds the latency threshold: storing data, obtained by executing the first instance of the data query and corresponding to the data identifier, in a cache memory; and generating a pre-cache scheduling request identifying the data query and comprising an instruction to schedule a second instance of the data query.

According to a fourth aspect, there is provided a computer-implemented method comprising: receiving, at a pre-cache service, a second instance of a data query, the data query corresponding to a data identifier; in response to receiving the second instance of the data query, obtaining a last access time associated with data corresponding to the data identifier stored in a cache memory, wherein the last access time corresponds to a time at which a first instance of the data query was received from a requestor; determining that an elapsed time since the last access time does not exceed an access time threshold; generating a third instance of the data query in response to determining that the elapsed time since the last access time does not exceed the access time threshold; and queuing the third instance of the data query for the defined time interval.

According to come examples, the method may further comprise receiving, at the pre-cache service, the third instance of the data query; in response to receiving the third instance of the data query: obtaining the last access time associated with the data corresponding to the data identifier stored in the cache memory; determining that the elapsed time since the last access time exceeds an access time threshold; and in response to determining that the elapsed time since the last access time exceeds the access time threshold, not generating a fourth instance of the data query.

It will be appreciated that the above embodiments have been disclosed by way of example only. Other variants or use cases may become apparent to a person skilled in the art once given the disclosure herein. The scope of the present disclosure is not limited by the above-described embodiments, but only by the accompanying claims.

The invention claimed is:
1. A computer-implemented method comprising:
 receiving, from a requestor, a first instance of a data query, the data query corresponding to a data identifier;
 executing the first instance of the data query; and
 based on a determination that a time taken to execute and obtain a result of the first instance of the data query exceeds a latency threshold:
  storing data, obtained by executing the first instance of the data query and corresponding to the data identifier, in a cache memory;
  generating a pre-cache scheduling request identifying the data query and comprising an instruction to schedule a second instance of the data query to be executed after a time interval has elapsed; and
  generating the second instance of the data query based on the pre-cache scheduling request.
2. The method of claim 1, wherein the method further comprises:
 based on receiving the first instance of the data query, accessing the cache memory; and
 determining that there is no data corresponding to the data identifier stored in the cache memory,
 wherein the first instance of the data query is executed based on determining that there is no data corresponding to the data identifier stored in the cache memory.
3. The method of claim 1, wherein the data is stored in the cache memory with an operation time defining a time at which the stored data was obtained, wherein the method further comprises:
 based on receiving the first instance of the data query, accessing the cache memory;
 obtaining, from the cache memory, the operation time stored with the data corresponding to the data identifier; and
 determining that an elapsed time since the operation time exceeds an operation time threshold, wherein the first instance of the data query is executed based on determining that the elapsed time since the operation time exceeds the operation time threshold.

4. The method of claim 1, wherein the method further comprises:
receiving a third instance of the data query from the requestor;
based on receiving the third instance of the data query, accessing the cache memory;
obtaining the data corresponding to the data identifier stored in the cache memory; and
storing, with the data corresponding to the data identifier in the cache memory, a current time as a last access time.

5. The method of claim 4, wherein the method further comprises making the data obtained by executing the third instance of the data query available to the requestor.

6. The method of claim 1, wherein the method further comprises deriving the data identifier from the data query.

7. The method of claim 1, wherein the method further comprises sending the pre-cache scheduling request to a pre-cache service.

8. The method of claim 1, wherein the method further comprises:
receiving, at a pre-cache service, the pre-cache scheduling request; and
based on receiving the pre-cache scheduling request:
queuing the second instance of the data query for the time interval.

9. The method of claim 8, wherein the method further comprises sending the second instance of the data query to a message bus queue, wherein the second instance of the data query is queued at the message bus queue for the time interval.

10. The method of claim 8, wherein the method further comprises, after the time interval has elapsed:
receiving, at the pre-cache service, the second instance of the data query;
based on receiving the second instance of the data query:
executing the second instance of the data query;
updating the data corresponding to the data identifier stored in the cache memory with the data obtained by executing the second instance of the data query;
generating a fourth instance of the data query; and
queuing the fourth instance of the data query for the time interval.

11. The method of claim 1, wherein the data corresponding to the data identifier is stored in the cache memory with an operation time defining a time at which the data was obtained, wherein the method further comprises, based on receiving the second instance of the data query:
updating the operation time stored in the cache memory.

12. The method of claim 10, wherein the method further comprises, based on receiving the second instance of the data query:
obtaining a last access time associated with the data corresponding to the data identifier stored in the cache memory, wherein the last access time corresponds to a time at which the first instance of the data query was received from the requestor; and
determining that an elapsed time since the last access time does not exceed an access time threshold,
wherein the fourth instance of the data query is generated based on determining that the elapsed time since the last access time does not exceed the access time threshold.

13. The method of claim 8, wherein the method further comprises, after the time interval has elapsed:
receiving, at the pre-cache service, the second instance of the data query;
based on receiving the second instance of the data query:
obtaining a last access time associated with the data corresponding to the data identifier stored in the cache memory, wherein the last access time corresponds to a time at which the first instance of the data query was received from the requestor;
determining that an elapsed time since the last access time exceeds an access time threshold; and
based on determining that the elapsed time since the last access time exceeds the access time threshold, not generating a fourth instance of the data query.

14. The method of claim 13, wherein the method further comprises removing the stored data from the cache memory.

15. The method of claim 1, wherein the method further comprises:
receiving, from the requestor, a first instance of a second data query, the second data query corresponding to a second data identifier;
executing the first instance of the second data query;
determining that a second time taken to execute the first instance of the second data query does not exceed the latency threshold;
based on determining that the second time taken to execute the first instance of the second data query does not exceed the latency threshold:
receiving a second instance of the second data query; and
executing the second instance of the second data query.

16. The method of claim 1, wherein the method further comprises making the data obtained by executing the first instance of the data query available to the requestor.

17. The method of claim 1, wherein the data identifier is a hash value derived from the data query.

18. The method of claim 1, wherein the method further comprises, based on receiving the second instance of the data query:
obtaining a last access time associated with the data corresponding to the data identifier stored in the cache memory, wherein the last access time corresponds to a time at which the first instance of the data query was received from the requestor; and
generating the second instance of the data query based on an elapsed time since the last access time not exceeding an access time threshold.

19. A computer device comprising:
a processing unit;
a memory coupled to the processing unit and configured to store executable instructions which, upon execution by the processing unit, are configured to cause the processing unit to:
receive, from a requestor, a first instance of a data query, the data query corresponding to a data identifier;
execute the first instance of the data query; and
based on a determination that a time taken to execute and obtain a result of the first instance of the data query exceeds a latency threshold:
store data, obtained by executing the first instance of the data query and corresponding to the data identifier, in a cache memory;
generate a pre-cache scheduling request identifying the data query and comprising an instruction to schedule a second instance of the data query to be executed after a time interval has elapsed; and
generate the second instance of the data query based on the pre-cache scheduling request.

20. A non-transitory computer-readable storage device comprising instructions executable by a processor for:
receiving, from a requestor, a first instance of a data query, the data query corresponding to a data identifier;
executing the first instance of the data query; and
based on a determination that a time taken to execute and obtain a result the first instance of the data query exceeds a latency threshold:
storing data, obtained by executing the first instance of the data query and corresponding to the data identifier, in a cache memory;
generating a pre-cache scheduling request identifying the data query and comprising an instruction to schedule a second instance of the data query; and
generating the second instance of the data query based on the pre-cache scheduling request.

* * * * *